（12) United States Patent
Terai

(10) Patent No.: US 6,253,409 B1
(45) Date of Patent: Jul. 3, 2001

(54) WIPER DEVICE FOR VEHICLES HAVING MECHANISM FOR LIFTING WIPER BLADE WITH LESS RATTLING NOISE

(75) Inventor: Tadayoshi Terai, Hamamatsu (JP)

(73) Assignee: ASMO Co., Ltd., Kosai (JP)

( * ) Notice: Subject to any disclaimer, the term of this patent is extended or adjusted under 35 U.S.C. 154(b) by 0 days.

(21) Appl. No.: 09/433,803

(22) Filed: Nov. 3, 1999

(30) Foreign Application Priority Data

Nov. 5, 1998 (JP) .................................................. 10-314855

(51) Int. Cl.⁷ ........................................................ B60S 1/32
(52) U.S. Cl. ..................................... 15/250.19; 15/250.16; 15/250.23; 15/250.351
(58) Field of Search .................... 15/250.19, 250.351, 15/250.352, 250.44, 250.001, 250.16, 250.17, 250.23

(56) References Cited

U.S. PATENT DOCUMENTS 4,040,141 * 8/1977 O'Steen ............................... 15/250.19

FOREIGN PATENT DOCUMENTS

| 2326251 | * | 12/1974 | (DE) | .................................. | 15/250.19 |
| 253696 | * | 1/1988 | (EP) | .................................. | 15/250.19 |
| 63-28062 | | 2/1988 | (JP) . | | |
| 6-67228 | | 9/1994 | (JP) . | | |

* cited by examiner

Primary Examiner—Gary K. Graham
(74) Attorney, Agent, or Firm—Fish & Richardson P.C.

(57) ABSTRACT

In a wiper device for vehicles, a wiper blade is rotatably connected to a wiper arm at a holding axis. A slider unit is attached to the wiper blade at a position being shifted from the holding axis. A lifter is disposed at the vehicle body at a position where the wiper device is stopped and the wiper blade is concealed. The slider unit runs onto the lifter to lift the wiper blade so that the wiper blade may be rotated on the holding axis until the wiper blade comes in contact with the wiper arm when the wiper device is stopped and the wiper blade is concealed. An elastic element for absorbing noise such as rubber or sponge is disposed between the wiper arm and wiper blade so that the wiper blade comes in contact with the wiper arm via the elastic element when the wiper blade is lifted.

10 Claims, 13 Drawing Sheets

WIPER DEVICE FOR VEHICLES HAVING MECHANISM FOR LIFTING WIPER BLADE WITH LESS RATTLING NOISE

CROSS REFERENCE TO RELATED APPLICATION

This application is based upon and claims the benefit of priority of Japanese Patent Application No. H.10-314855 filed on Nov. 5, 1998, the contents of which are incorporated herein by reference.

BACKGROUND OF THE INVENTION

1. Field of the Invention

The present invention relates to a wiper device for wiping a wind shield glass of a vehicle having a simple mechanism for lifting a wiper blade at a place where the wiper device is stopped and the wiper blade is concealed with less rattling noises.

2. Description of Related Art

A conventional wiper device for wiping a wind shield glass of a vehicle is provided with a mechanism for lifting a wiper blade to prevent deformation of a blade rubber of the wiper blade which is pressed against the wind shield glass by a biasing force of a wiper arm when the wiper device is stopped.

In the wiper device with the wiper blade lifting mechanism, the wiper arm holds the wiper blade so as to make the wiper blade pivot on a holding axis. The wiper arm is provided with a slider capable of running onto a lifter located at a place where the wiper device is stopped and the wiper blade is concealed. Therefore, when the wiper blade is stopped and concealed, the wiper blade is lifted not to make the blade rubber touch on any portion of a vehicle body so that the deformation of the blade rubber may be prevented.

The conventional wiper device, however, has a drawback that, during the period when the wiper blade is stopped and concealed, the wiper blade tends to pivot on the holding axis due to the vehicle body vibration generated by the vehicle running on the road, in particular, on uneven road. As a result, both ends of the wiper blade are likely to touch on the vehicle body, thus causing rattling noises.

To cope with this problem, as shown in FIG. 14, there is a conventional wiper device 80 in which the wiper arm 12 is provided on a leading end thereof with an E type clip 81 for holding the wiper blade 14 and a letter Z shaped plate spring stopper 82 is inserted between the E type clip 81 and the wiper blade 14. Therefore, the pivoting movement of the wiper blade 14 is restrained by the biasing force of the plate spring stopper 82 so that the rattling noises may be prevented.

However, the conventional wiper device mentioned above needs a special structure for holding the wiper blade (the E type clip 81, the letter Z shaped plate spring stopper 82 and so on) so that more number of component parts and more time for fabrication may become necessary, resulting in higher cost.

Further, in case of replacing a used wiper blade (or blade rubber, if easily detached from the lever of the wiper blade) which is held by the wiper arm under the special structure mentioned above, the plate spring stopper 82 has to be reset at a given position when a new wiper blade is attached to the wiper arm so that replacement work of the wiper blade may be troublesome.

SUMMARY OF THE INVENTION

The present invention has been made in view of the above mentioned problem, and an object of the present invention is to provide a wiper device for vehicles having a simple construction for lifting the wiper blade so that the wiper blade may be easily replaced and, further, the rattling noises may be suppressed.

To achieve the above object, the wiper blade having a holding axis through which the wiper blade is rotatably held by the wiper arm. A slider unit is attached to the wiper blade at a position being shifted in a direction of the wiper arm or in an opposite direction to the wiper arm from the holding axis. A lifter is disposed at the vehicle body at a position where the wiper device is stopped and the wiper blade is concealed.

According to the wiper device mentioned above, the slider unit runs onto the lifter to lift the wiper blade so that the wiper blade may be rotated on the holding axis until the wiper blade is stopped in relation to the wiper arm when the wiper device is stopped and the wiper blade is concealed.

Further, an elastic element for absorbing noise such as rubber or sponge is disposed between the wiper arm and wiper blade so that the wiper blade comes in contact with the wiper arm via the elastic element when the wiper blade is lifted.

Furthermore, the wiper blade has ventilation holes on an upper side and the slider is provided at an end in an axial direction of the wiper blade with a projecting portion clinched to a periphery of the ventilation holes and at another end in an axial direction of the wiper blade with a rivet fastened at another periphery of the ventilation holes so that the slider is tightly fixed with the wiper blade without moving in the ventilation holes.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

A first preferred embodiment of the present invention is described hereinafter according to FIGS. 1 to 5.

Figure 1:
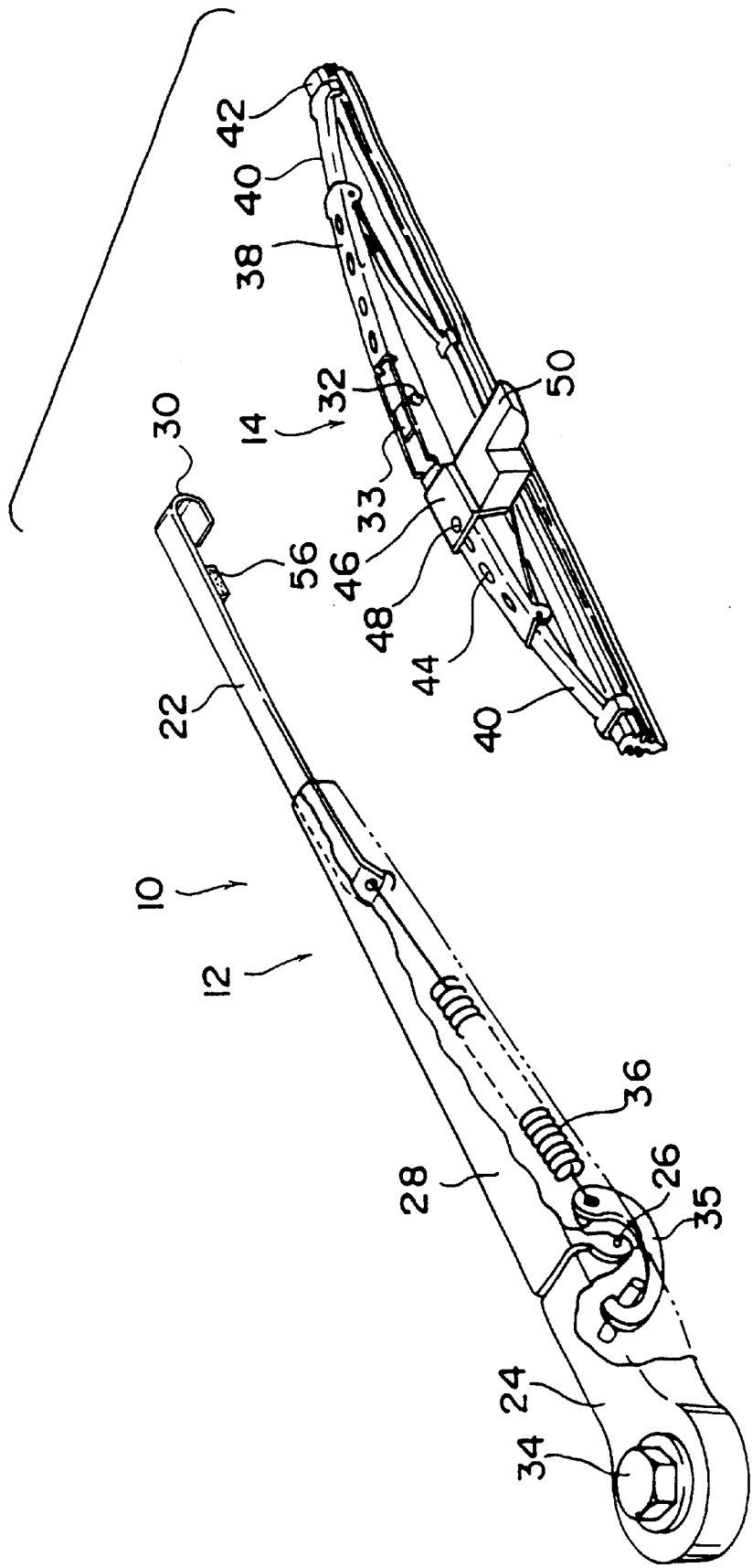
FIG. 1 is a perspective view showing a wiper arm and a wiper blade according to a first embodiment of the present invention.

As shown in FIG. 1, a wiper device 10 has a wiper arm 12 and a wiper blade 14. The wiper arm 12 is provided with an arm head 24, a retainer 28 held rotatably at a leading end of the arm head 24 through a hinge 26 and an arm piece 22 fixed at a leading end of the retainer 28. A leading end of the arm piece 22 is rounded to form a semicircular shaped hook portion 30.

An extension coil spring 36 is housed inside the retainer 28 via a hook 35 between the arm piece 22 and the arm head 24. A biasing force of the extension coil spring 36 causes the wiper arm 12 to exert an arm pressure acting toward a wind shield glass of the vehicle. The wiper blade 14 is composed of a primary lever 38, a pair of secondary levers 40 and a blade rubber 42. A connecting element 33 is rotatably mounted on a rivet shaft 32 acting as a holding axis at a longitudinal center of the primary lever 38. The hook portion 30 of the wiper arm 12 is engaged with the connecting element 33 so that the wiper blade may be connected with the wiper arm 12 so as to be rotatable within a given range.

A rotating movement of the wiper blade 14 on the rivet shaft 32 is stopped when the primary lever 38 of the wiper blade 14 comes in contact with the arm piece 22 of the wiper arm 12.

An elastic element 56 such as rubber is disposed on a lower surface of the arm piece 22 at a position where the wiper arm 12 comes in contact with the wiper blade 14. The elastic element 56 absorbs touch or contact noises to be generated when the wiper blade 12 touches the wiper arm 12 or the wiper arm 12 and the wiper blade 14 are in contact with each other.

The primary lever 38 is provided with a slider base plate 46 and a slider 50. The slider base plate 46 has a portion extending on a front surface side of the wiper blade 14 to which the slider 50 is attached. A position of the slider 50 is shifted on a side of the wiper arm 12 from the rivet shaft 32 and the slider 50 protrudes in a direction perpendicular to the wiper blade 14. The slider base plate 46 and the slider 50 constitutes a slider unit.

Figure 2:
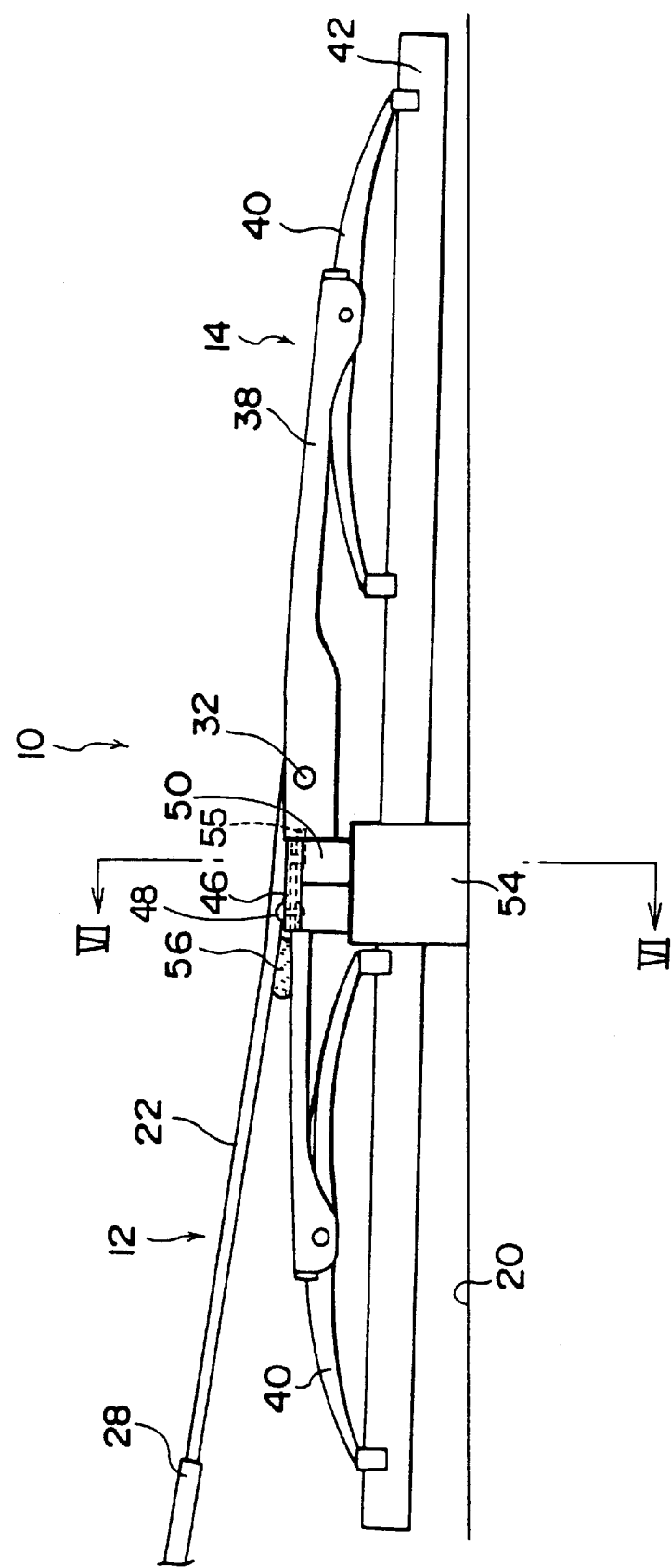
FIG. 2 is a side view showing a main portion of the wiper device according to the first embodiment of the present invention when the wiper device is stopped.
Figure 3:
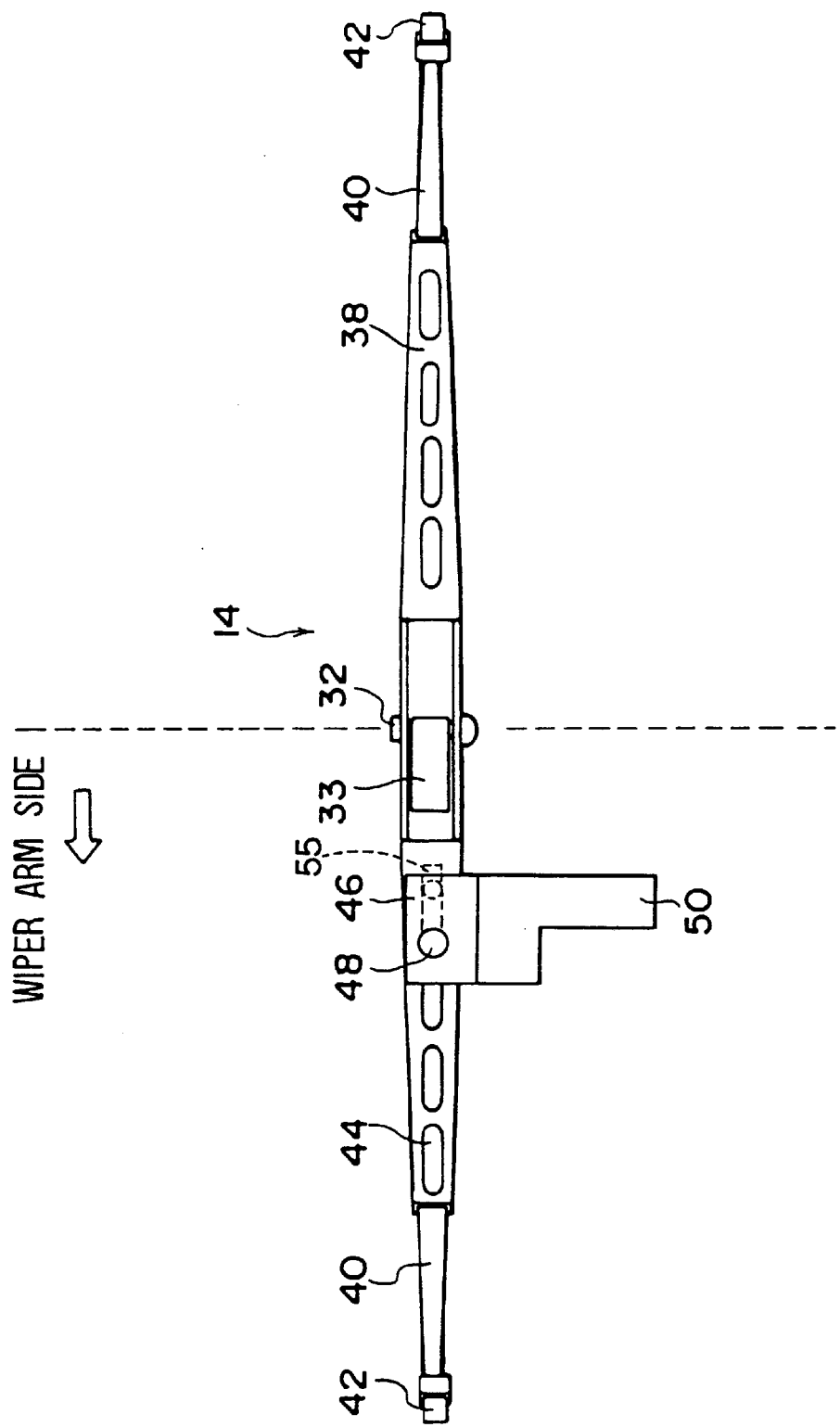
FIG. 3 is a top view showing the wiper blade according to the first embodiment of the present invention.

The primary lever 38 is provided with a plurality of ventilation holes 44 and, as shown in FIGS. 2 and 3, the slider base plate 46 is provided on a back surface facing the primary lever 38 at an end axial to the primary lever 38 with a letter L shaped projection 55 bending toward the rivet shaft 32. After inserting the L shaped projection 55 into one of the ventilation holes 44 and moving the slider base plate 46 toward the rivet shaft 32 until the L shaped projection 55 clinches to a periphery of the one of the ventilation holes 44, the slider base plate 46 is fixed to the primary lever 38 by a rivet 48 at the other end axial to the primary lever 38 at a periphery of an adjacent one of the ventilation holes. The rivet 48 and the L shaped projection 55 are in the ventilation holes 44 and are engaged with the peripheries of the ventilation holes 44 so that the slider base plate 46 may be tightly fixed to the primary lever 38 not to move in the ventilation holes 44. The slider base plate 46 and the slider 50 mentioned above are so compact not to interrupt a visual field of a driver.

Figure 5:
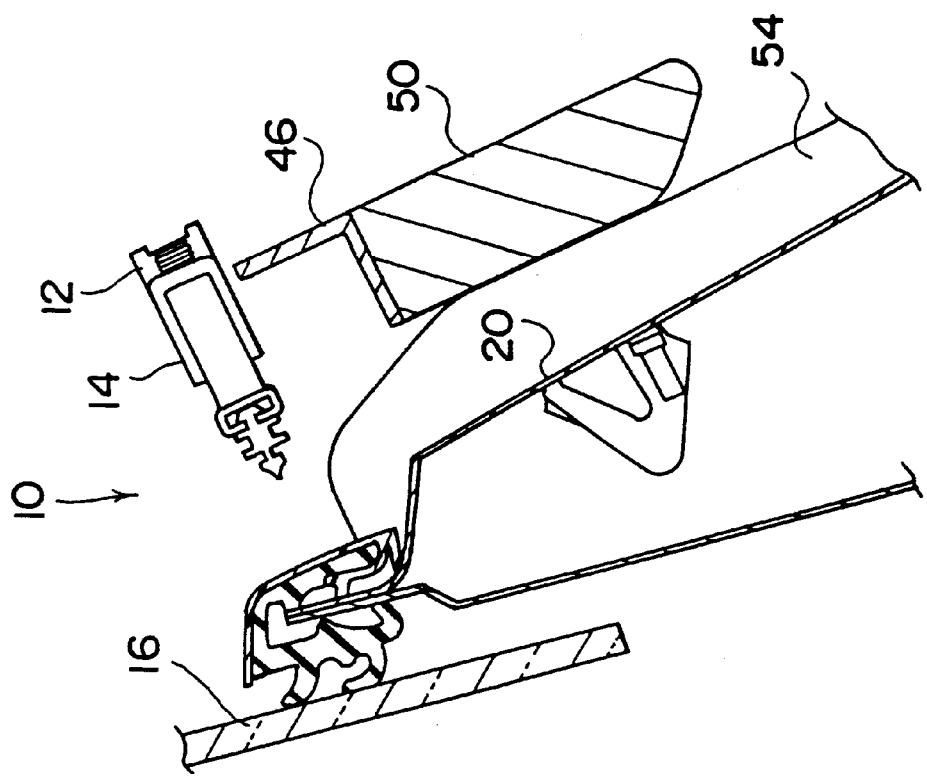
FIG. 5 is a cross sectional view taken along a line V—V of FIG. 2.
Figure 6:
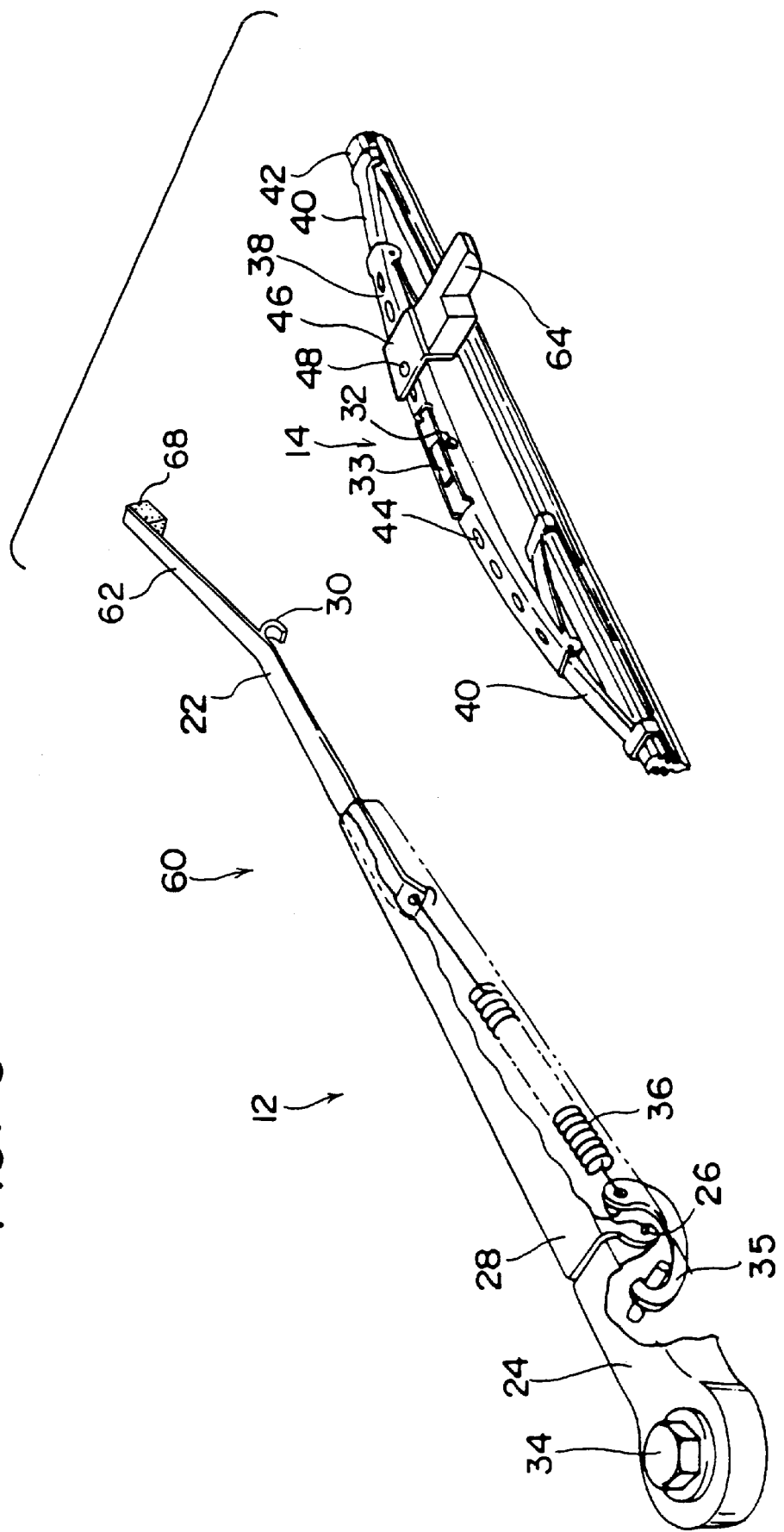
FIG. 6 is a perspective view showing a wiper arm and a wiper blade according to a second embodiment of the present invention.

As shown in FIG. 5, the arm head 24 of the wiper arm 12 is fixed by a nut 34 to a pivot shaft (not shown) protruding from a cowl cover 20 located beneath the wind shield glass 16 for vehicles. The wiper blade 14 is moved rotatably and reciprocatingly to wipe the wind shield glass 16 according to a rotating and reciprocating movement of the wiper arm 12 driven by a wiper motor (not shown) through the pivot shaft.

The cowl cover 20 is provided with a lifter 54 at a position where the slider 50 stays when the wiper device 10 is stopped and the wiper blade 14 (as well as the wiper arm 12) is concealed. The slider 50 runs onto the lifter 54 when the wiper device 10 is stopped and the wiper blade 14 concealed so that the wiper blade 14 may be lifted at a position where the wiper blade 14 is stopped and concealed.

The height of the lifter 54, as shown in FIG. 2, is decided to the extent that the blade rubber 42 does not touch on any portion of the vehicle body (cowl 20) when the wiper blade is lifted.

Figure 4:
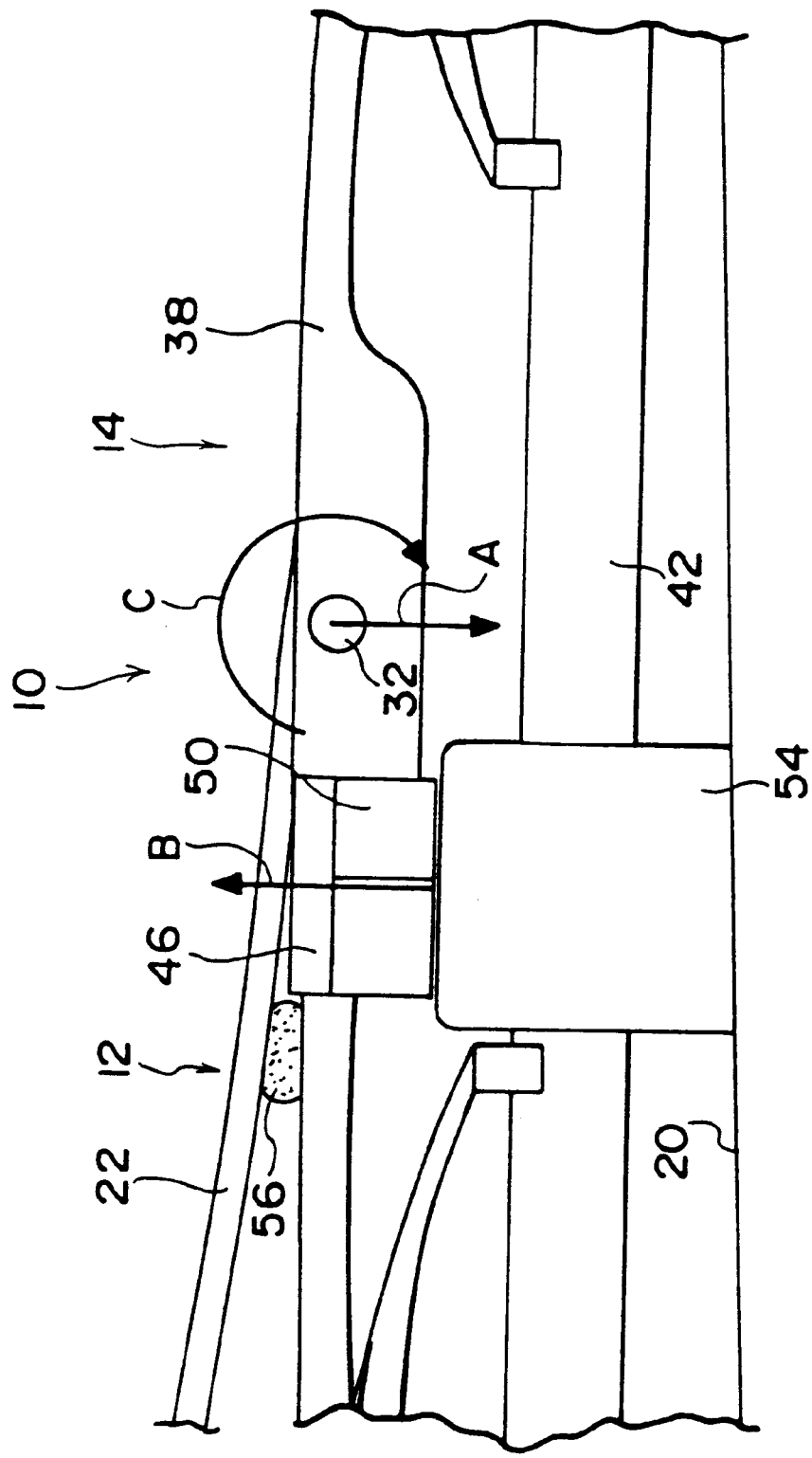
FIG. 4 is a side view showing a portion around a rivet shaft of the wiper device according to the first embodiment of the present invention when the wiper device is stopped.

As shown in detail in FIG. 4, when the wiper blade 14 is lifted, the wiper blade 14 is pressed at a point of the rivet shaft 32 toward the vehicle body (in a direction of an arrow A in FIG. 4) by the arm pressure of the wiper arm 12. On the other hand, the lifter 54 pushes up the wiper blade 14 in an opposite direction to the lifter 54 (in a direction of an arrow B in FIG. 4). As the slider 50 is located at the position being shifted toward the wiper arm 12 from the rivet shaft 32, a rotating force on the rivet shaft 32 in a direction of an arrow C in FIG. 4 is exerted with respect to the wiper blade 14.

Therefor, the wiper blade 14 is rotated in the arrow C direction until the wiper blade 14 comes in contact with the wiper arm 12 and the rotating force in the arrow C direction is kept to act on the wiper blade 14 in contact with the wiper arm 12. Consequently, the wiper blade 14 can not rattle even in the vehicle vibration so that the rattling noises may be prevented.

Further, when the wiper blade 14 is lifted and comes in contact with the wiper arm 12, the elastic element 56 disposed on the lower side of the arm piece 22 touches the wiper blade 14. Thus, touch noises to be generated when the wiper blade 14 is lifted and touches the wiper arm 12 can be absorbed by the elastic element 56.

Furthermore, the elastic element 56 also absorbs contact noises to be generated when the wiper arm 12 and the wiper blade are respectively vibrated and come in contact with each other during the period when the wiper blade 14 is lifted.

As mentioned above, as the blade rubber 42 does not touch on any portion of the vehicle body, the deformation of the blade rubber 42, which will be made if the blade rubber 42 is pushed on the vehicle body for a long time by the arm pressure of the wiper arm 12, can be prevented.

According to the embodiment mentioned above, to connect the wiper blade 14 to the wiper arm 12, the wiper device 10 does not have a special structure such as the E type clip 81 and the plate spring stopper 82, but has a simple structure composed of the rivet shaft 32 of the wiper blade 14, the connecting element 33 and the hook portion 30 of the wiper arm 12. Therefore, the wiper blade 14 can be connected to the wiper arm 12 by engaging the hook portion 30 with the connecting element 33 attached to the rivet shaft 32 without using a special tool. Thus, the replacement work of the wiper blade 14 is very easy.

Further, according to the embodiment mentioned above, the number of the component parts constituting the structure for connecting the wiper blade 14 to the wiper arm 12 is smaller than that of the conventional structure having the E type clip 81 and the plate spring stopper 82 and, thus, the time required for fabricating the wiper device 10 is less, compared with the conventional wiper device. As a result, the wiper device 10 of the present invention may be manufactured at a cheaper cost than the conventional wiper device, while the rattling noises can be prevented.

Next, the wiper device according to a second embodiment of the present invention is described with reference to FIGS. 6 to 9. With respect to parts and components having the similar function and effect to those of the first embodiment, same reference numbers are affixed and the detail explanation thereof is omitted.

The wiper device 60 for vehicles is provided with an extending portion 62 extending slightly upward from the hook portion 30 along an axial line of the wiper arm 12. A slider 64 attached to the wiper blade 14 is positioned at a place being shifted from the position of the rivet shaft 32 in a direction opposite to the wiper arm 12 (on a side of the extending portion 62) and faces the extending portion 62.

Figure 7:
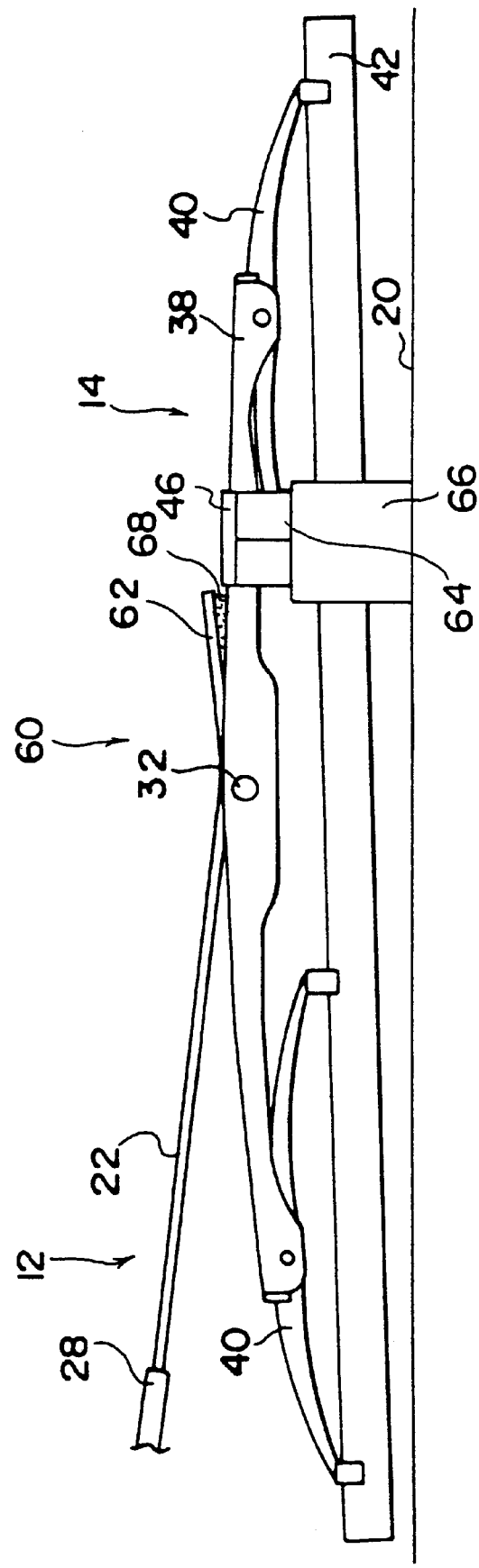
FIG. 7 is a side view showing a main portion of the wiper device according to the second embodiment of the present invention when the wiper device is stopped.
Figure 8:
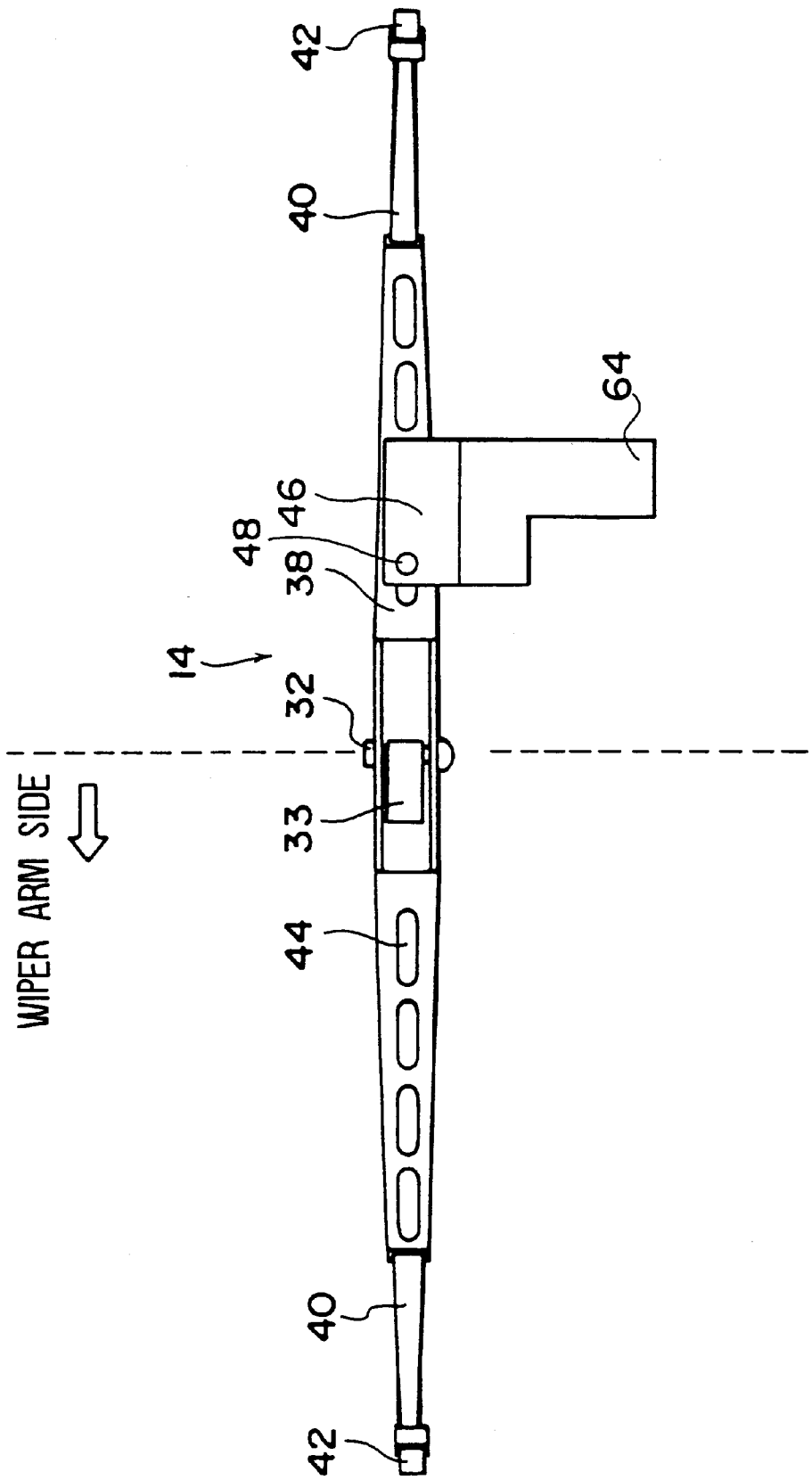
FIG. 8 is a top view showing the wiper blade according to the second embodiment of the present invention.

As illustrated in FIG. 7, the rotating movement of the wiper blade 14 on the rivet shaft 32 is stopped when the primary lever 38 comes in contact with a leading end of the extending portion 62.

An elastic element 68 such as rubber is disposed on a lower surface of the leading end of the extending portion 62 at a position where the wiper blade 14 is lifted and comes in contact with the wiper arm 12. The elastic element 68 absorbs touch noises to be generated when the wiper blade 12 is lifted and touches the wiper arm 12.

The cowl cover 20 is provided with a lifter 66 at a position where the slider 64 stays when the wiper device 60 is stopped and the wiper blade 14 is concealed. The slider 64 runs onto the lifter 66 when the wiper device 60 is stopped and the wiper blade 14 concealed so that the wiper blade 14 may be lifted at a position where the wiper blade 14 is stopped and concealed.

Figure 9:
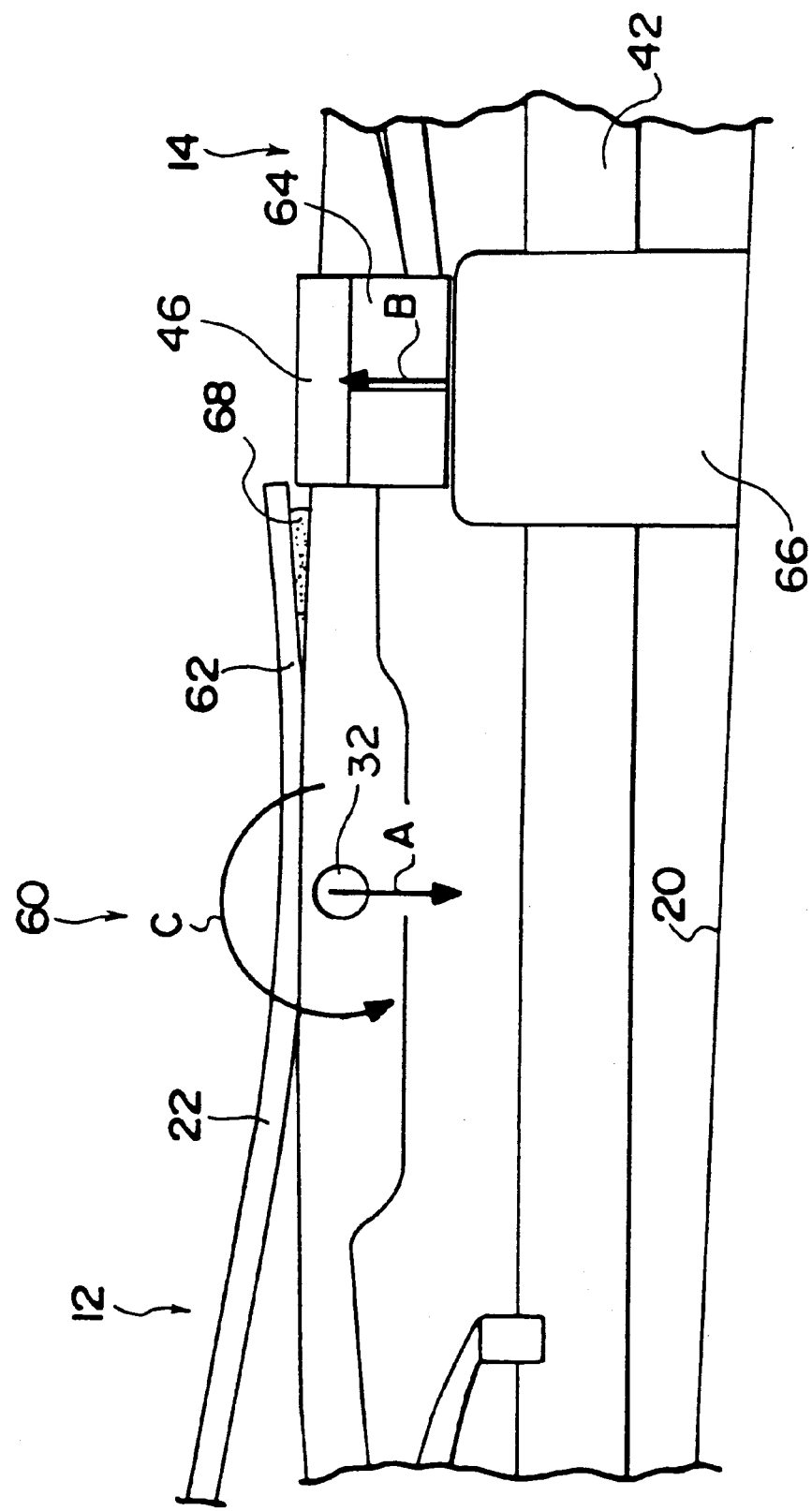
FIG. 9 is a side view showing a portion around a rivet shaft of the wiper device according to the second embodiment of the present invention when the wiper device is stopped.
Figure 10:
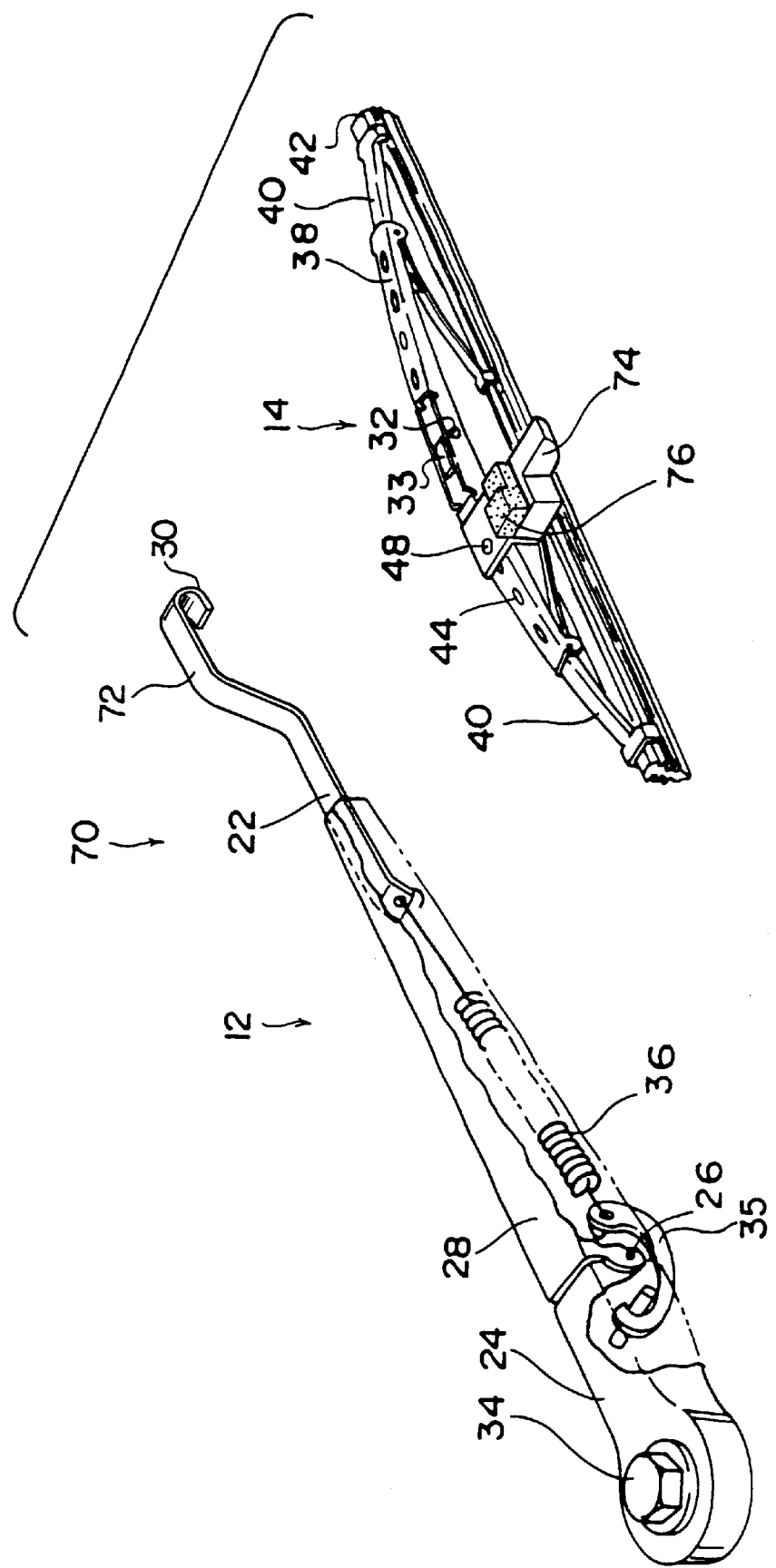
FIG. 10 is a perspective view showing a wiper arm and a wiper blade according to a third embodiment of the present invention.

As shown in detail in FIG. 9, when the wiper blade 14 is lifted, the wiper blade 14 is pressed at a point of the rivet shaft 32 toward the vehicle body (in a direction of an arrow A in FIG. 9) by the arm pressure of the wiper arm 12. on the other hand, the wiper blade 14 is pushed up by the lifter 66 in an opposite direction to the lifter 66 (in a direction of an arrow B in FIG. 9). As the slider 64 is located at the position being shifted on a side opposite to the wiper arm 12 from the rivet shaft 32, a rotating force on the rivet shaft 32 in a direction of an arrow C in FIG. 9, which is opposite to that of the first embodiment, is exerted with respect to the wiper blade 14.

Therefor, the wiper blade 14 is rotated in the arrow C direction until the wiper blade 14 comes in contact with the wiper arm 12 and the rotating force in the arrow C direction is kept to act on the wiper blade 14 in contact with the wiper arm 12. Consequently, the wiper blade 14 can not rattle even in the vehicle vibration so that the rattling noises may be prevented.

Further, when the wiper blade 14 is lifted and comes in contact with the wiper arm 12, the elastic element 68 disposed on the lower side of the leading end of the extending portion 62 touches the wiper blade 14. Thus, touch noises to be generated when the wiper blade 14 is lifted and touches the wiper arm 12 can be absorbed by the elastic element 68.

Furthermore, the elastic element 68 also absorbs contact noises to be generated when the wiper arm 12 and the wiper blade are respectively vibrated and come in contact with each other during the period when the wiper blade 14 is lifted.

The wiper blade 14 can be connected to the wiper arm 12 by engaging the hook portion 30 with the connecting element 33 attached to the rivet shaft 32 without using a special tool. Thus, the replacement work of the wiper blade 14 is very easy, while the rattling noises may be prevented when the wiper blade 14 is lifted.

Next, a wiper device 70 according to a third embodiment is described with reference to FIGS. 10 to 13.

The arm piece 22 of the wiper device 70 is provided with a bending portion 72. As an axis of the wiper arm 12 and an axis of the wiper blade 14 are shifted with a predetermined distance, the bending portion 72 is so constituted that an arm piece 22 is bent in a crank shape and the hook portion 30 at a leading end of the arm piece 22 is engaged with the connecting element 33 of the wiper blade 14.

In the wiper device 70 according to the third embodiment, a slider 74 attached to the wiper blade 14 is positioned at a place being shifted from the rivet shaft 32 in a direction of the wiper arm 12 and faces the bending portion 72.

Figure 11:
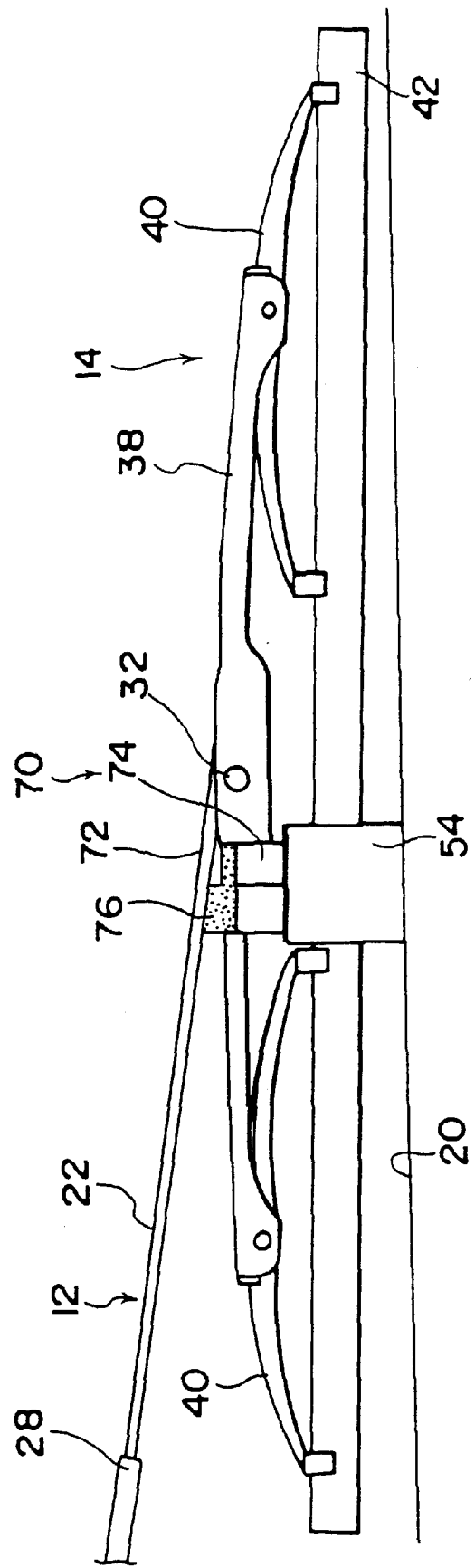
FIG. 11 is a a side view showing a main portion of the wiper device according to the third embodiment of the present invention when the wiper device is stopped.
Figure 12:
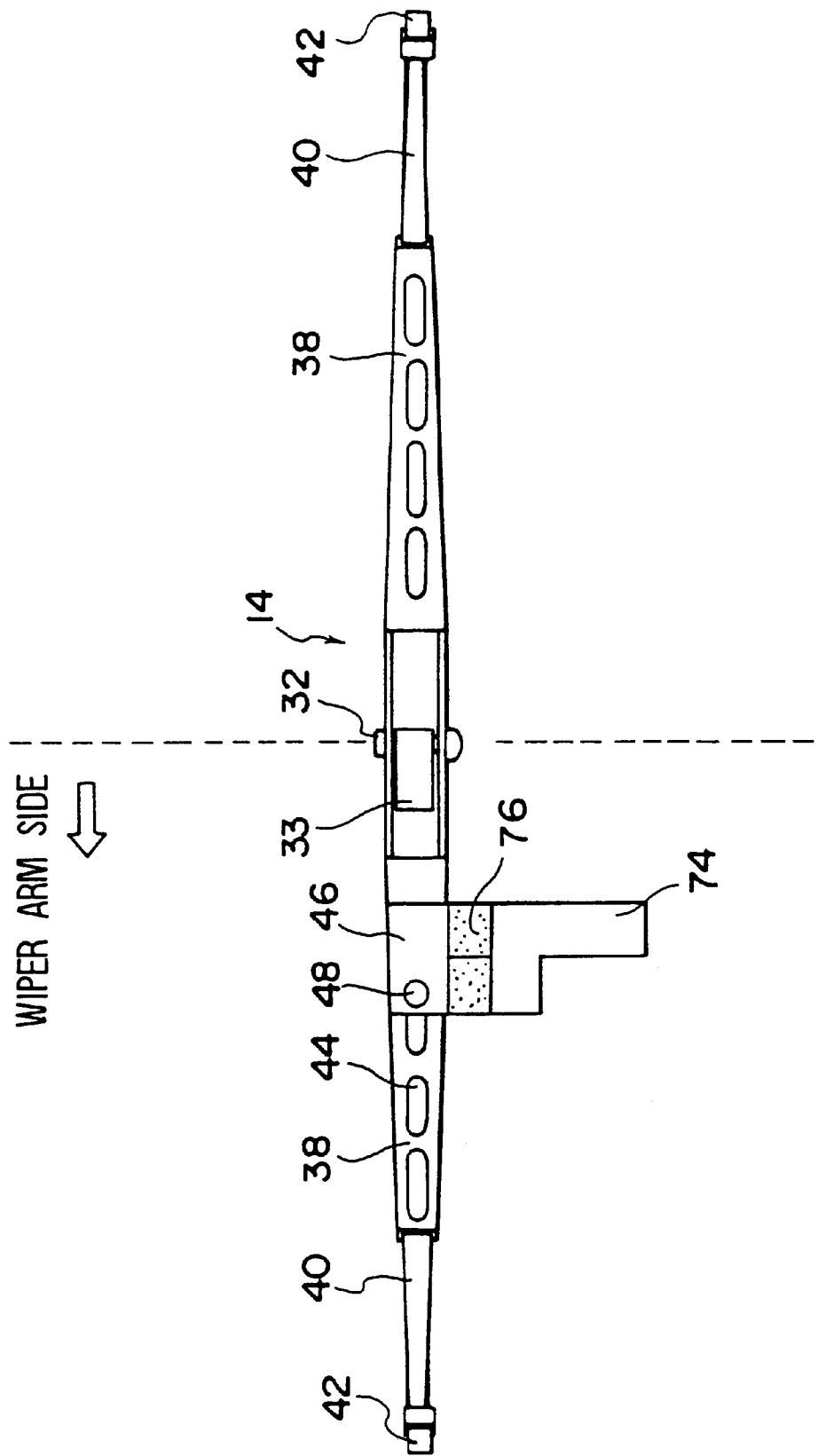
FIG. 12 is a top view showing the wiper blade according to the second embodiment of the present invention.

As illustrated in FIG. 11, the rotating movement of the wiper blade 14 on the rivet shaft 32 is stopped when the slider 74 attached to the wiper blade 14 comes in contact with the bending portion 72 of the wiper arm 12.

An elastic element 76 such as rubber is disposed on the slider 74 at a position where the wiper blade 14 is lifted and the slider 74 comes in contact with the bending portion 72 of the wiper arm 12. The elastic element 76 absorbs touch noises to be generated when the wiper blade 12 is lifted and the slider 74 touches the wiper arm 12.

Figure 13:
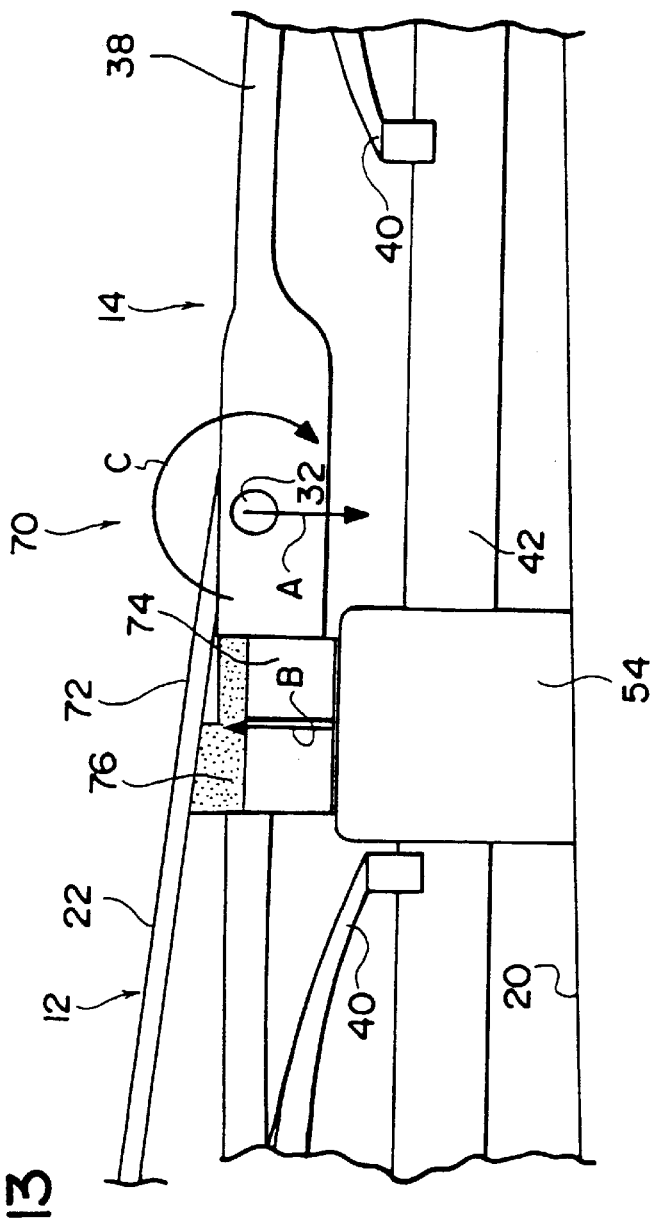
FIG. 13 is a side view showing a portion around a rivet shaft of the wiper device according to the third embodiment of the present invention when the wiper device is stopped.
Figure 14:
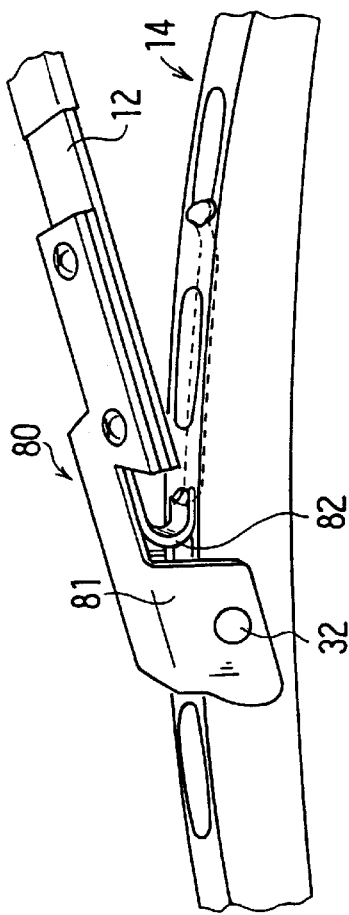
FIG. 14 is a schematic side view showing a part of a wiper device according to prior art.

As shown in detail in FIG. 13, when the wiper blade 14 is lifted, the wiper blade 14 is pressed at a point of the rivet shaft 32 toward the vehicle body (in a direction of an arrow A in FIG. 13) by the arm pressure of the wiper arm 12. On the other hand, the wiper blade 14 is pushed up by a lifter 54 in an opposite direction to the lifter 54 (in a direction of an arrow B in FIG. 13). As the slider 74 is located at the position being shifted on a side of the wiper arm 12 from the rivet shaft 32, a rotating force on the rivet shaft 32 in a direction of an arrow C in FIG. 13 is exerted with respect to the wiper blade 14.

Therefor, the wiper blade 14 is rotated in the arrow C direction until the slider 74 attached to the wiper blade 14 comes in contact with the bending portion 72 of the wiper arm 12 and the rotating force in the arrow C direction is kept to act on the slider 72 in contact with the wiper arm 12. Consequently, the wiper blade 14 can not rattle even in the vehicle vibration so that the rattling noises may be prevented.

Further, the elastic element 76 also absorbs contact noises to be generated when the wiper arm 12 and the wiper blade are respectively vibrated and come in contact with each other during the period when the wiper blade 14 is lifted.

The wiper blade 14 can be connected to the wiper arm 12 by engaging the hook portion 30 with the connecting element 33 attached to the rivet shaft 32 without using a special tool. Thus, the replacement work of the wiper blade 14 is very easy, while the rattling noises may be prevented when the wiper blade 14 is lifted.

In the first to third embodiments, the elastic element 56, 68, 76 may be made of not only rubber material but also sponge sheet or other sheet for absorbing noises. Further, the slider unit comprised of the slider base plate 46 and the slider 50, 64, 74 may be integrally constructed.

What is claimed is:

1. A wiper device for wiping wind shield glass surface of a vehicle body comprising:
    a wiper arm facing the wind shield glass surface and making a rotating and reciprocating movement, wherein the wiper arm exerts an arm pressure acting toward the wind shield glass surface;
    a wiper blade having a holding axis through which the wiper blade is rotatably held by the wiper arm, wherein the wiper blade is in contact with the wind shield glass surface due to a biasing force of the arm pressure and rotatably and reciprocatingly wipes the wind shield glass surface according to the movement of the wiper arm;
    a slider unit attached to the wiper blade at a position being shifted by a predetermined amount from the holding axis; and
    a lifter disposed at the vehicle body at a position where the wiper device is stopped and the wiper blade is in a stop position, wherein the slider unit runs onto the lifter to lift the wiper blade so that the wiper blade is rotated about the holding axis until the wiper blade comes in contact with and is pressed against the wiper arm on a side of the slider unit with respect to the holding axis when the wiper device is stopped and the wiper blade is in a stop position.

2. A wiper device for wiping a wind shield glass surface of a vehicle body, further comprising:
    a wiper arm facing the wind shield glass surface and making a rotating and reciprocating movement, wherein the wiper arm exerts an arm pressure acting toward the wind shield glass surface;
    a wiper blade having a holding axis through which the wiper blade is rotatably held by the wiper arm, wherein the wiper blade is in contact with the wind shield glass surface due to a biasing force of the arm pressure and rotatably and reciprocatingly wipes the wind shield glass surface according to the movement of the wiper arm;
    a slider unit attached to the wiper blade at a position being shifted by a predetermined amount from the holding axis;
    a lifter disposed at the vehicle body at a position where the wiper device is stopped and the wiper blade is in a stop position, wherein the slider unit runs onto the lifter to lift the wiper blade so that the wiper blade is rotated about the holding axis until the wiper blade comes in contact with and is pressed against the wiper arm on a side of the slider unit with respect to the holding axis when the wiper device is stopped and the wiper blade is in a stop position; and
    an elastic element for absorbing noise disposed between the wiper arm and wiper blade, wherein the wiper blade comes in contact with the wiper arm via the elastic element when the wiper blade is lifted.

3. Wiper device according to claim 2, wherein the elastic element is made of any one of rubber and sponge.

4. A wiper device according to claim 2, wherein the slider is attached to the wiper blade at the position being shifted in a direction of the wiper arm from the holding axis.

5. Wiper device according to claim 4, further comprising:
    an elastic element for absorbing noises disposed between the wiper arm and wiper blade, wherein the wiper blade comes in contact with the wiper arm via the elastic element when the wiper blade is lifted.

6. Wiper device according to claim 5, wherein the elastic element is made of any one of rubber and sponge.

7. Wiper device according to claim 4, further comprising:
    an elastic element for absorbing noise disposed between the slider unit and the wiper arm, wherein the slider unit comes in contact with the wiper arm via the elastic element when the wiper blade is lifted.

8. Wiper device according to claim 7, wherein the elastic element is made of any one of rubber and sponge.

9. Wiper device according to claim 4, wherein the wiper blade has ventilation holes on an upper side and the slider unit is provided at an end in an axial direction of the wiper blade with a projecting portion clinched to a periphery of the ventilation holes and at another end in the axial direction of the wiper blade with a rivet fastened at another periphery of the ventilation holes so that the slider unit is tightly fixed with the wiper blade not to move in the ventilation holes.

10. A wiper device for wiping a wind shield glass surface of a vehicle body, further comprising:
    a wiper arm facing the wind shield glass surface and making a rotating and reciprocating movement, wherein the wiper arm exerts an arm pressure acting toward the wind shield glass surface;
    a wiper blade having a holding axis through which the wiper blade is rotatably held by the wiper arm, wherein the wiper blade is in contact with the wind shield glass surface due to a biasing force of the arm pressure and rotatably and reciprocatingly wipes the wind shield glass surface according to the movement of the wiper arm;
    a slider unit attached to the wiper blade at a position being shifted by a predetermined amount from the holding axis; and
    a lifter disposed at the vehicle body at a position where the wiper device is stopped and the wiper blade is in a stop position, wherein the slider unit runs onto the lifter to lift the wiper blade so that the wiper blade is rotated about the holding axis until the wiper blade comes in contact with and is pressed against the wiper arm on a side of the slider unit with respect to the holding axis when the wiper device is stopped and the wiper blade is in a stop position,
    wherein the wiper blade has ventilation holes on an upper side and the slider unit is provided at an end in an axial direction of the wiper blade with a projecting portion clinched to of a periphery the ventilation holes and at another end in the axial direction of the wiper blade with a rivet fastened at another periphery of the ventilation holes so that the slider unit is tightly fixed with the wiper blade not to move in the ventilation holes.

* * * * *